(12) United States Patent
Lush

(10) Patent No.: US 7,237,508 B1
(45) Date of Patent: Jul. 3, 2007

(54) BIRD FEEDER

(76) Inventor: Raymon W. Lush, 402 S. 1st St., Bloomfield, NE (US) 68718

( * ) Notice: Subject to any disclaimer, the term of this patent is extended or adjusted under 35 U.S.C. 154(b) by 0 days.

(21) Appl. No.: 11/481,871

(22) Filed: Jul. 6, 2006

(51) Int. Cl.
*A01K 39/01* (2006.01)

(52) U.S. Cl. .................................. 119/57.8

(58) Field of Classification Search ........... 119/51.04, 119/57.8, 57.9, 52.1, 52.2, 52.3, 346, 428, 119/429, 431, 433, 435, 434, 51.01, 51.03, 119/52.4, 53, 65, 68, 69; D30/124, 127; 43/58, 100, 102, 103, 105
See application file for complete search history.

(56) References Cited

U.S. PATENT DOCUMENTS

| | | | | |
|---|---|---|---|---|
| 5,235,935 | A * | 8/1993 | Edwards | 119/57.8 |
| 6,047,661 | A * | 4/2000 | Lush | 119/51.01 |
| 6,866,004 | B1 | 3/2005 | Lush | 119/52.1 |
| 7,021,240 | B1 * | 4/2006 | Tippetts | 119/52.1 |
| 7,032,538 | B1 | 4/2006 | Lush | 119/52.1 |
| 7,131,395 | B1 * | 11/2006 | Lush | 119/57.8 |
| 2004/0123808 | A1 * | 7/2004 | Dunn | 119/57.9 |

* cited by examiner

*Primary Examiner*—Son T. Nguyen

(57) ABSTRACT

A tube-type bird feeder comprised of a plurality of tube sections joined together and angularly disposed with respect to one another. A level feed disk is provided within the feeder at the juncture of the angularly disposed tube sections.

9 Claims, 3 Drawing Sheets

BIRD FEEDER

BACKGROUND OF THE INVENTION

1. Field of the Invention

This invention relates to a tube-type bird feeder and more particularly to a tube-type bird feeder which is comprised of a plurality of tube sections which are angularly disposed with respect to one another to generally form a Z-shape.

2. Description of the Related Art

Many types of bird feeders have been previously provided with some of those bird feeders being of the tube-type. In some of the tube-type bird feeders, perch rods are extended through the tube so that birds may perch on the opposite ends thereof. In the tube feeders of the mesh-type, the birds cling to the mesh and feed through the openings formed therein. Normally, to the best of applicant's knowledge, all of the tube-type feeders are straight with the lengths thereof sometimes being limited due to the space available in which the feeder is to be located. For example, if space is only available for a 12-inch feeder, the capacity of that 12-inch feeder will be limited by the length of the feeder and the diameter of the feeder. Further, to the best of applicant's knowledge, level feed devices have not been utilized in tube-type feeders which will cause feed to remain thereabove even though the main feed level has dropped below the level feed disks.

SUMMARY OF THE INVENTION

A bird feeder of the tube-type is disclosed which is comprised of a hollow tubular member having upper and lower ends adapted to contain bird feed therein. The lower end of the tubular member is closed with the upper end of the tubular member being selectively closed by a lid, cover, etc. The tubular member is comprised of tube sections which are disposed at an angle with respect to one another with the tube sections being comprised of a mesh material defining openings to enable birds to cling thereto and to permit the birds to feed through the openings in the tube sections. Preferably, the tube sections are disposed at a 90° angle with respect to one another and may either have a round cross-section, a square cross-section or a rectangular cross-section. A level feed disk or baffle is positioned within the tubular member at the juncture of each of the tube sections to maintain a certain amount of feed thereabove even though the main feed level has dropped therebelow.

It is therefore a principal object of the invention to provide an improved bird feeder of the tube-type.

A further object of the invention is to provide a tube-type bird feeder which is comprised of a plurality of tube sections which are angularly disposed with respect to one another.

Still another object of the invention is to provide a feeder of the type described which includes level feed means therein at the junctures of the angularly disposed tube sections.

Still another object of the invention is to provide a bird feeder having an increased capacity for feed for its overall length.

These and other objects will be obvious to those skilled in the art.

DETAILED DESCRIPTION OF THE INVENTION

Figure 1:
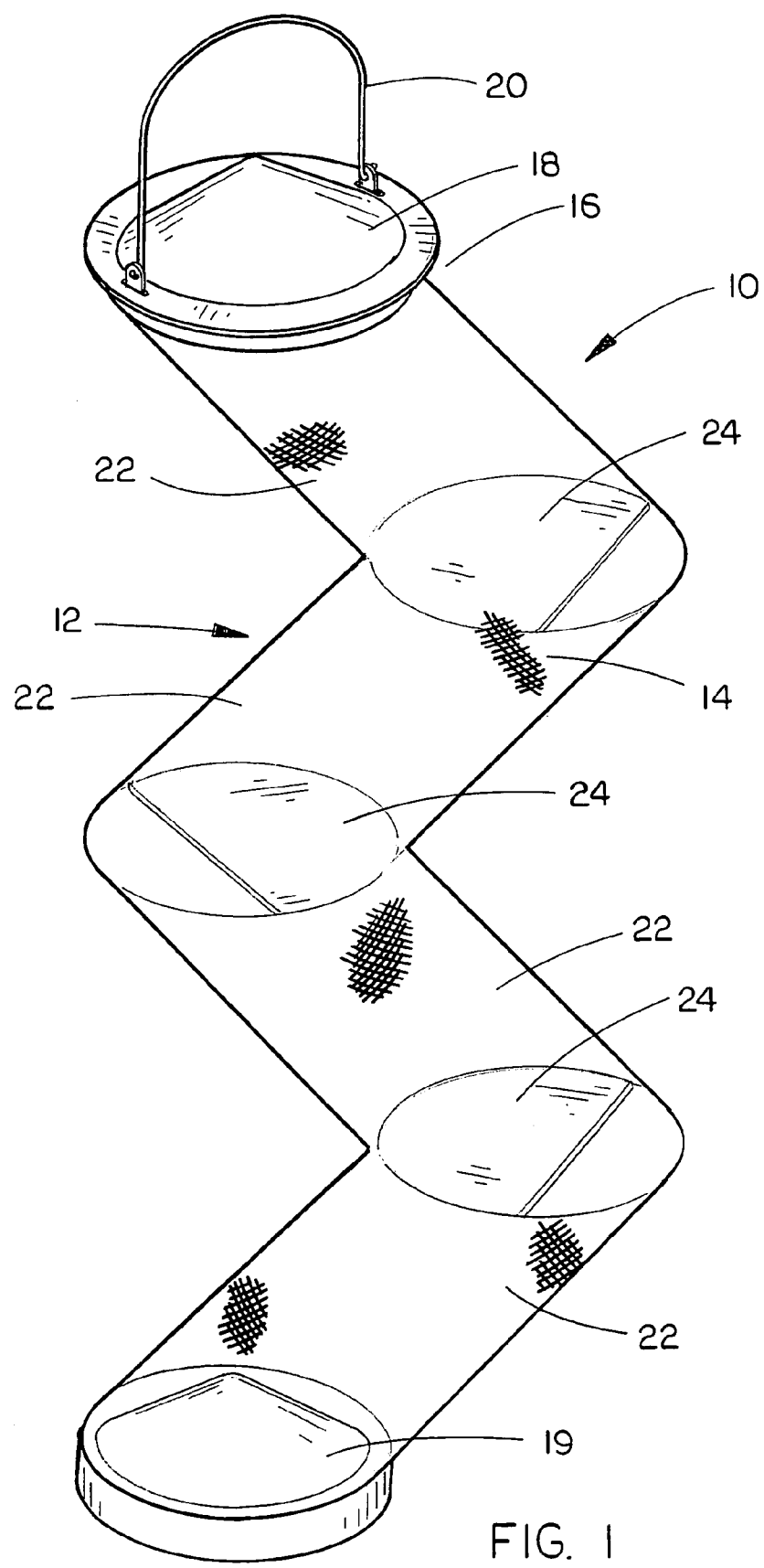
FIG. 1 is a perspective view of the bird feeder of this invention.

The bird feeder of this invention is referred to generally by the reference numeral 10 which is of the "tube-type" feeder. Feeder 10 is comprised of a hollow tubular member 12 constructed of a metal mesh material defining openings 14, the size of which will vary depending upon the type of bird feed being fed. Tubular member 12 has an open upper end 16 which is selectively closed by a lid, cap, cover, etc., 18, and a closed lower end or bottom 19. Hanger 20 is secured to the upper end of the tubular member 12 to enable the feeder to be supported from a tree branch, etc.

Figure 2:
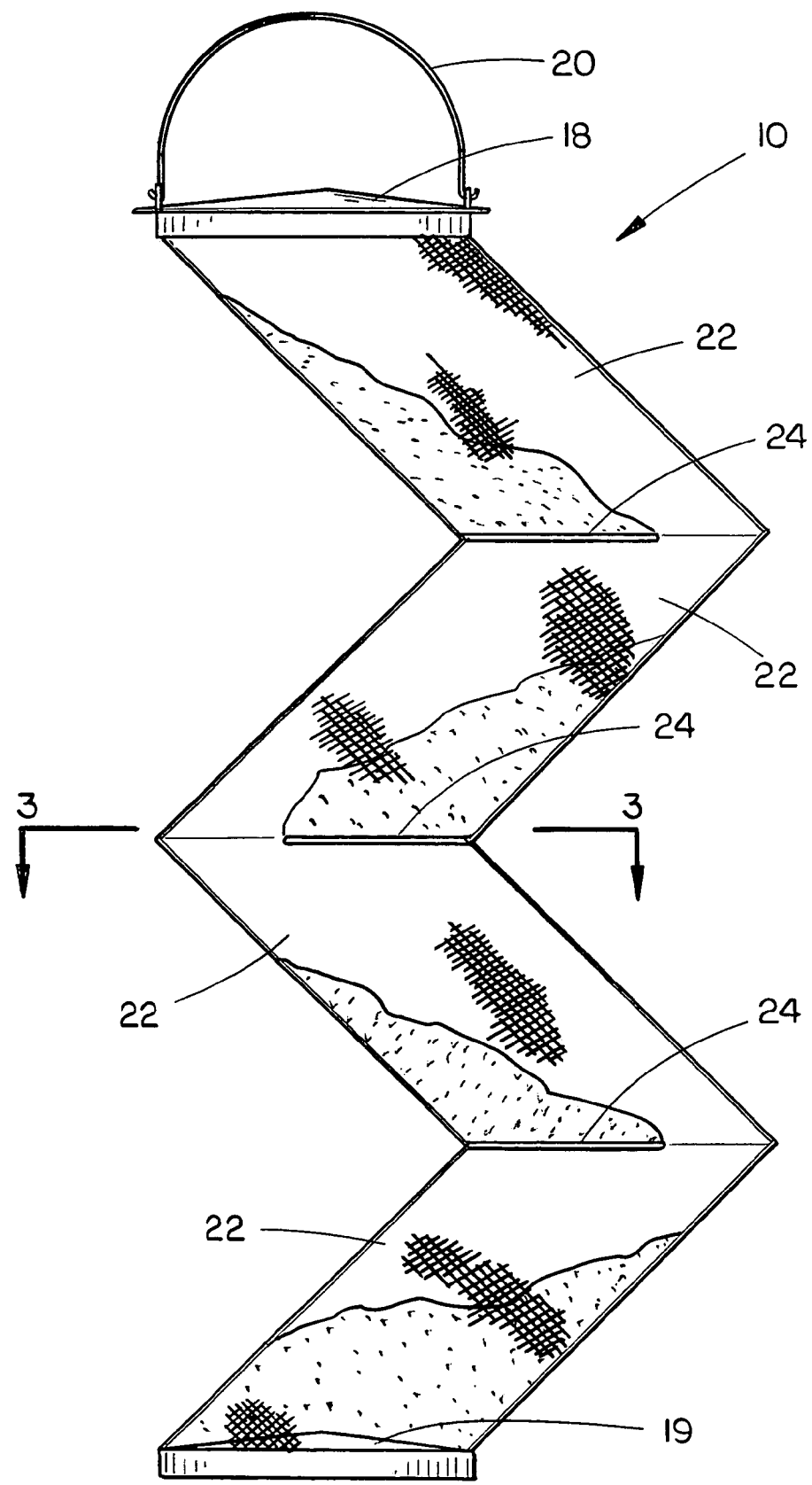
FIG. 2 is a side view of the bird feeder of this invention with portions thereof cut away to more fully illustrate the invention.
Figure 3A:
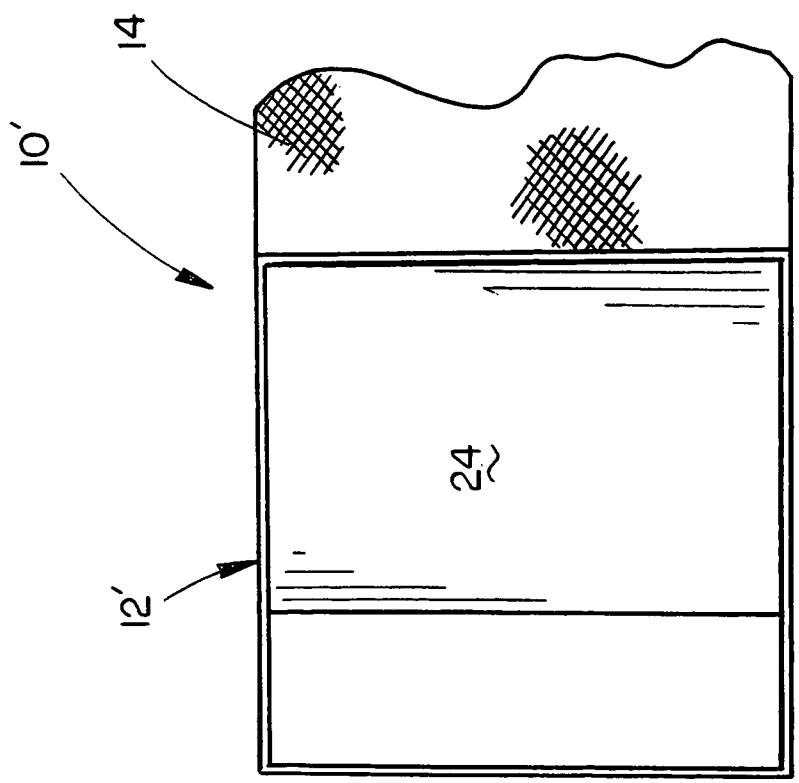
FIG. 3A is a sectional view as seen on lines 3-3 of FIG. 2 when the tube sections have a cylindrical cross-section.
Figure 3B:
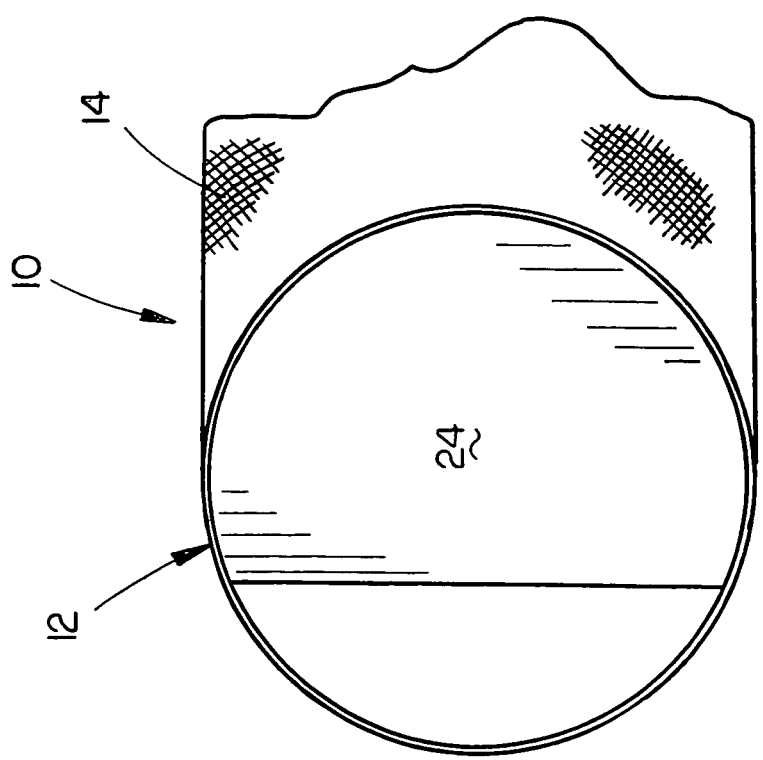
FIG. 3B is a sectional view as seen on lines 3-3 of FIG. 2 when the tube sections have a square cross-section.

Tubular member 12 is comprised of a plurality of tube sections 22 which are angularly disposed with respect to one another. Preferably, the angle between the tube sections is approximately 90°. Tube sections 22 may have a round cross-section, a square cross-section, or a rectangular cross-section. FIGS. 1-3A illustrate a feeder having a round or cylindrical cross-section while FIG. 3B illustrates a feeder having a square cross-section. The overall height (length) of the feeder is preferably approximately twelve inches with the length of each of the tube sections being preferably approximately four and one-half inches. Thus, in a twelve inch feeder, the cumulative length of a four tube section design will be approximately eighteen inches, thereby increasing the capacity of the feeder.

Preferably, the feeder 10 also includes level feed disks or baffles 24 provided therein at the juncture of the tube sections 22, as seen in the drawings. The disks 24 partially close the interior of the tubular member 12 so that a certain amount of feed will remain on and above the disks 24 even though the main feed level has dropped below the disks, as seen in FIG. 2. If the tubular member 12 has a diameter of three inches, the length of the disks 24 should be approximately two inches. It is preferred that the bottom 19 of the feeder be cone-shaped, as seen in the drawings, to direct the feed thereon outwardly towards the sides of the lowermost tube section 22. FIG. 3B illustrates a feeder 10' wherein the tube sections 22' are square.

Thus, when filled with bird food, the birds may cling to the exterior surfaces of the tube sections 22 and 22' and feed through the openings 14 in the mesh material. The level feed disks or baffles 24 maintain feed thereabove so that feed will be available to the birds above the main feed level. The angular configuration of the tubular member provides an inclined surface to which the birds may cling and also provides increased feed capacity for a twelve inch feeder or other length feeder.

It can therefore be seen that the invention accomplishes at least all of its stated objectives.

I claim:

1. A bird feeder, comprising:
   a hollow tubular member having upper and lower ends adapted to contain bird feed therein;
   said lower end of said tubular member being closed;
   said upper end of said tubular member being selectively closed;

said tubular member being comprised of tube sections connected together and having upper and lower ends;
each of said tube sections having a longitudinal axis;
said longitudinal axes of adjacent tube sections being disposed at an angle with respect to one another;
said tubular member being comprised of a mesh material defining openings to enable birds to cling thereto and to permit the birds to feed through the openings in the tubular member.

2. The bird feeder of claim 1 wherein the longitudinal axes of adjacent tube sections are disposed at a 90° angle with respect to one another.

3. The bird feeder of claim 1 wherein said tube sections have a round cross-section.

4. The bird feeder of claim 1 wherein said tube sections have a square cross-section.

5. The bird feeder of claim 1 wherein level feed disks are positioned within said tubular member at the juncture of adjacent tube sections.

6. The bird feeder of claim 5 wherein said level feed disks are horizontally disposed.

7. The bird feeder of claim 5 wherein said level feed disks have a length less than the diameter of said tubular member.

8. The bird feeder of claim 5 wherein said tubular member has a diameter of approximately three inches and wherein said level feed disks have a length of approximately two inches.

9. The bird feeder of claim 1 wherein said tubular member is comprised of at least four tube sections.

* * * * *